United States Patent
Seo et al.

(10) Patent No.: US 11,041,574 B2
(45) Date of Patent: Jun. 22, 2021

(54) JIG FOR ASSEMBLING FULLY WELDED BALL VALVE

(71) Applicant: HS Valve Co., Ltd., Daegu (KR)

(72) Inventors: Joungdae Seo, Gyeongsan-si (KR); Youn Gil Jung, Yeongcheon-si (KR); Hyunseok Yun, Pohang-si (KR)

( * ) Notice: Subject to any disclaimer, the term of this patent is extended or adjusted under 35 U.S.C. 154(b) by 261 days.

(21) Appl. No.: 16/405,999

(22) Filed: May 7, 2019

(65) Prior Publication Data
US 2020/0292092 A1    Sep. 17, 2020

(30) Foreign Application Priority Data

Mar. 12, 2019  (KR) .................. 10-2019-0027866

(51) Int. Cl.
*F16K 27/10* (2006.01)
*F16K 5/06* (2006.01)
(Continued)

(52) U.S. Cl.
CPC .............. *F16K 27/107* (2013.01); *F16K 5/06* (2013.01); *F16K 25/00* (2013.01); *F16K 27/067* (2013.01);
(Continued)

(58) Field of Classification Search
CPC ... F16K 5/06; F16K 5/201; F16K 5/20; F16K 25/00; F16K 27/067; F16K 27/107;
(Continued)

(56) References Cited

U.S. PATENT DOCUMENTS 2,890,017 A * 6/1959 Shafer .................. F16K 27/107
251/174
3,000,083 A * 9/1961 Bryant .................. B23P 15/001
29/890.131
(Continued)

FOREIGN PATENT DOCUMENTS

CN     108561583 A *  9/2018
EP        1323965 A1 *  7/2003 ............. B23K 37/06
(Continued)

OTHER PUBLICATIONS

English Specification of 10-1558308.
English Specification of 10-1180284.

*Primary Examiner* — David Colon-Morales
(74) *Attorney, Agent, or Firm* — Antonio Ha & U.S. Patent, LLC (57) ABSTRACT

According to an embodiment of the disclosure, a jig for assembling a fully welded ball valve includes a fastening end having a projecting insertion pipe inserted through the first end piece pipe to an inside of the second end piece pipe and configured to support the first end piece pipe to stably maintain a state of the first and second end piece pipes being inserted through the insertion holes of the valve body, a pressurizing plate configured to pressurize the second end piece pipe to the first end piece pipe, a pressurizing device configured to press the pressurizing plate to pressurize the second end piece pipe, a load cell configured to measure a pressure applied by the pressurizing device, and a controller configured to output the pressure measured by the load cell.

4 Claims, 6 Drawing Sheets

(51) Int. Cl.
*F16K 27/06* (2006.01)
*B23K 37/04* (2006.01)
*B23K 101/04* (2006.01)
*F16K 25/00* (2006.01)
*G01L 5/00* (2006.01)

(52) U.S. Cl.
CPC ........ *G01L 5/0038* (2013.01); *B23K 37/0443* (2013.01); *B23K 2101/04* (2018.08)

(58) Field of Classification Search
CPC ..... F16K 27/10; B23K 37/0443; B23K 3/087; B23K 2101/04; G01L 5/0061; G01L 5/0038; G01L 5/0028; Y10T 29/49425; B23P 15/001
See application file for complete search history.

(56) References Cited

U.S. PATENT DOCUMENTS

| | | | | |
|---|---|---|---|---|
| 3,157,190 A * | 11/1964 | Allen | ............... | F16K 29/02 137/330 |
| 3,235,226 A * | 2/1966 | Allen | ............... | F16K 27/107 251/309 |
| 3,241,808 A * | 3/1966 | Allen | ............... | F16K 5/0673 251/174 |
| 3,263,312 A * | 8/1966 | Shafer | ............... | F16K 27/107 29/890.131 |
| 3,275,025 A * | 9/1966 | Kowalski | ............... | F16K 5/0615 137/330 |
| 3,348,804 A * | 10/1967 | Piccardo | ............... | F16K 27/067 251/214 |
| 3,411,746 A * | 11/1968 | Scaramucci | ............... | F16K 5/0673 251/315.08 |
| 3,545,721 A * | 12/1970 | Shafer | ............... | B23K 9/0026 251/309 |
| 3,624,804 A * | 11/1971 | Piccardo | ............... | F16K 5/0647 251/367 |
| 3,657,783 A * | 4/1972 | Ellis | ............... | F16K 5/227 29/890.131 |
| 3,737,145 A * | 6/1973 | Heller | ............... | F16K 27/067 251/309 |
| 3,777,342 A * | 12/1973 | Allen | ............... | F16K 27/107 29/890.131 |
| 3,869,108 A * | 3/1975 | Graham | ............... | F16K 27/107 251/366 |
| 4,235,003 A * | 11/1980 | Gachot | ............... | F16K 27/067 228/214 |
| 5,735,047 A * | 4/1998 | Evans | ............... | F16K 5/201 29/890.13 |
| 5,890,286 A * | 4/1999 | Eklof | ............... | F16K 27/067 29/890.13 |
| 6,643,929 B2 * | 11/2003 | Yokomi | ............... | F16K 27/067 29/890.128 |
| 2004/0117986 A1* | 6/2004 | Eklof | ............... | F16K 27/067 29/890.131 |

FOREIGN PATENT DOCUMENTS

| | | | | |
|---|---|---|---|---|
| EP | 3753668 A1 * | 12/2020 | ............... | B23K 5/02 |
| KR | 10-1180284 | 9/2012 | | |
| KR | 10-1558308 | 10/2015 | | |

* cited by examiner

Fig. 1

Prior Art

JIG FOR ASSEMBLING FULLY WELDED BALL VALVE

CROSS-REFERENCE TO RELATED APPLICATION(S)

This application is based on and claims priority under 35 U.S.C. 119 to Korean Patent Application No. 10-2019-0027866, filed on Mar. 12, 2019, in the Korean Intellectual Property Office, the disclosure of which is herein incorporated by reference in its entirety.

TECHNICAL FIELD

Embodiments of the disclosure relate to jigs for fully welded ball valves, and specifically, to jigs for adjusting the ball-seat contact pressure and assembling fully welded ball valves based on the adjusted ball-seat contact pressure.

DESCRIPTION OF RELATED ART

For assembly, fully welded ball valves get through welding unlike other normal ball valves which use bolts for joining together a valve body, end piece pipes, and a valve stem.

Figure 1:
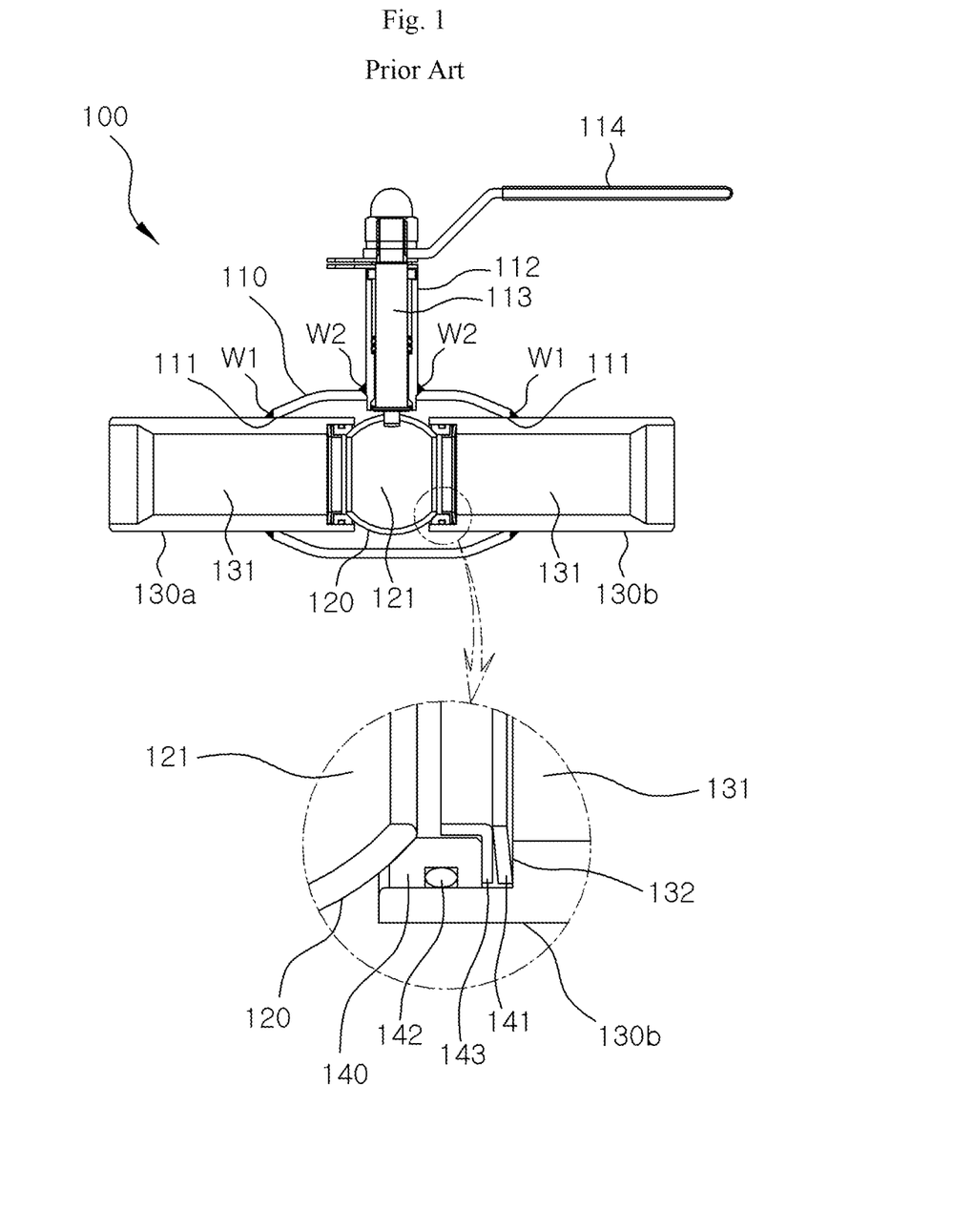
FIG. 1 is a cross-sectional view illustrating a fully welded ball valve according to the prior art.

Referring to FIG. 1, which is a cross-sectional view of a typical fully welded ball valve 100, the fully welded ball valve 100, like a normal ball valve, includes a ball 120 with a flow path hole 121 placed between hollow end piece pipes 130a and 130b which are aligned with the same axis, a valve body 110 with a neck 112, which surrounds the ball 120, and a valve stem 113 having one end fastened to the ball 120 and pass through the neck 112 and the other end rotated by a handle 114. As the ball 120 rotates, the space between the end piece pipes 130a and 130b on both sides of the ball 120 may be opened through the flow path hole 121 ("opening operation") or closed by the curved surface of the ball 120 where the flow path hole 121 is not formed ("closing operation").

The facing ends of the end piece pipes 130a and 130b, which contact the ball 120, may be expanded to have an increased inner diameter, thus producing stepped surfaces 132, and to have annular seats 140 fitted thereinto. A compression spring 141 is placed between the stepped surface 132 and the annular seat 140, giving a predetermined contact surface pressure between the ball 120 and the seat 140. An O-ring 142 is mounted on the outer circumferential surface of the seat 140 to seal off between the end piece pipes 130a and 130b. The O-rings 142 allow the flow paths 131 of the end piece pipes 130a and 130b to communicate with the flow path hole 121 of the ball 120 without leakage upon the opening operation and close the flow paths 131 of the end piece pipes 130a and 130b by the outer curved surface of the ball 120 without leakage upon the closing operation. A supporting ring 143 may be placed between the seat 140 and the spring 141 to wrap the inner surface of the seat 140.

In the fully welded ball valve 100 configured thus, welding W2 is performed between the valve body 110 and the neck 112, and welding W1 is performed between the valve body 110 and the end piece pipes 130a and 130b.

If the contact surface pressure between the ball 120 and each seat 140 is low, the capability of blocking off the flow path might not be enough, causing leakage. If the contact surface pressure is too high otherwise, the ball 120 might not rotate smoothly, rendering it difficult to normally perform the opening and closing operation. Thus, the end piece pipes 130a and 130b are welded to the valve body 110 while being pushed to the ball 120 to present a proper degree of contact surface pressure (W1).

The conventional assembly for such welding is described below with reference to FIG. 2.

Figure 2:
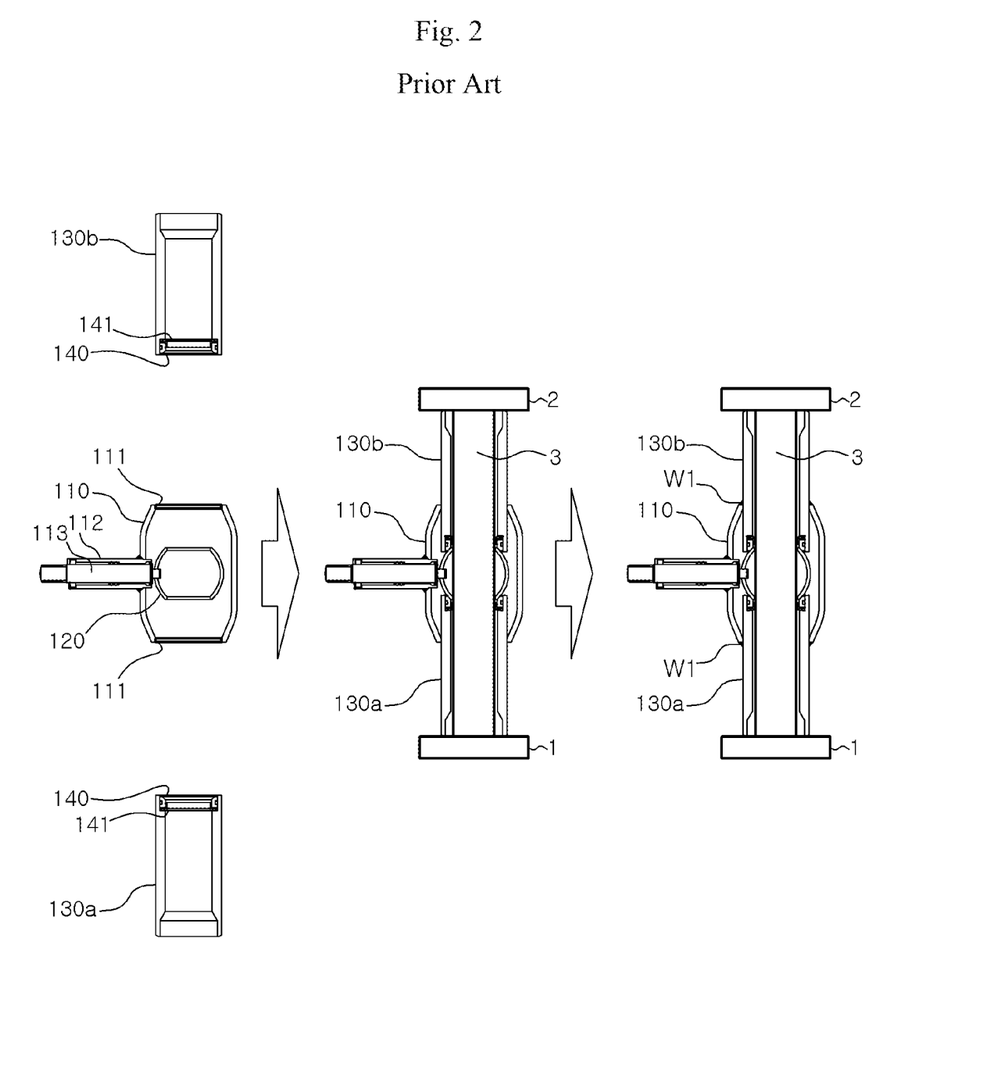
FIG. 2 is a view illustrating the process of assembling a fully welded ball valve using a fully welded ball valve assembly jig according to the prior art.

FIG. 2 is a view illustrating the process of assembling a fully welded ball valve 100 using a fully welded ball valve assembly jig according to the prior art.

Referring to FIG. 2, a valve body 110 is prepared by joining a valve stem 113 and a neck 112, with a ball 120 received rotatably between insertion holes 111 on both sides thereof. Two end piece pipes 130a and 130b with seats 140 mounted at the respective ends thereof are prepared. The valve body 110 and the end piece pipes 130a and 130b are assembled together using a jig. The jig includes a stationary end 1, a pressurizing plate 2, and an insertion pipe 3.

In assembly, the insertion pipe 3 projecting from the stationary end 1 is sequentially inserted through one end piece pipe 130a, the valve body 110, and the other piece pipe 130b, and the pressurizing plate 20 pressurizes the end piece pipe 130b. The pressurizing plate 2 performs pressurization until it reaches the insertion pipe 3 thereby allowing the interval between the end piece pipes 130a and 130b to remain constant.

Welding W1 is applied to the space between insertion holes 111 in both sides of the valve body 110 and the outer circumferences of the end piece pipes 130a and 130b, thereby joining the end piece pipes 130a and 130b to the valve body 110. The assembly of the fully welded ball valve is finished by mounting a handle 114 on the valve stem 113. An electromotive actuator may be installed instead of the handle 114.

The length of the insertion pipe 3 is determined according to the contraction length of the spring 141 which produces a predetermined, proper degree of, contact surface pressure between the ball 120 and the seat 140. The fully welded ball valve 100 assembled using the insertion pipe 3 so determined may be manufactured in a constant total length.

However, although the interval between the end piece pipes 130a and 130b is designed to produce a proper degree of contact surface pressure between the ball 120 and the seat 140, and the length of the insertion pipe 3 is accordingly determined and reflected in the assembly process, a deviation in contact surface pressure may occur per fully welded ball valve 100 produced, due to the dimensional tolerance of each part and the assembly tolerance.

The dimensional tolerance, as the gap between the maximum and minimum permissible limits of variation given in each part, is shown upon manufacture of each part, and when the parts are assembled, their dimensional tolerances are accrued to affect the assembly tolerance.

The dimensional tolerance and assembly tolerance may arise even during the course of assembling the ball-received valve body 110 and the seat-mounted end piece pipes 130a and 130b. Thus, despite using the insertion pipe 3 designed to have a uniform length in assembling a plurality of ball valves, the compression length of the spring 141 may differ per ball valve.

Furthermore, a constant contact pressure might not be achieved due to differences in nature of the springs 141 in the ball valve. If disk springs which exhibit a significant elastic restoration difference even with a slight compression difference are adopted for ball valves, the contact pressure may go off the permitted limit in design, with the result of defects.

SUMMARY

Embodiments of the disclosure aim to provide a fully welded ball valve assembly jig capable of precisely adjusting the contact surface pressure without influence by the dimensional tolerance or assembly tolerance and then assembling a fully welded ball valve.

According to an embodiment of the disclosure, a jig for assembling a fully welded ball valve is provided. The fully welded ball valve includes a valve body having a first insertion hole and a second insertion hole formed in both sides thereof and a ball rotatably received between the first insertion hole and the second insertion hole, a first end piece pipe and a second end piece pipe, respectively, inserted into the first insertion hole and the second insertion hole and each having an annular seat formed on an outer circumference of an edge of an end thereof and elastically brought in tight contact with the ball by a spring. The jig may be configured to adjust a contact surface pressure between the ball and the annular seat while stably holding the valve body and the first and second end piece pipes.

The jig includes a fastening end having a projecting insertion pipe inserted through the first end piece pipe to an inside of the second end piece pipe and configured to support the first end piece pipe to stably maintain a state of the first and second end piece pipes being inserted through the insertion holes of the valve body, a pressurizing plate configured to pressurize the second end piece pipe to the first end piece pipe, a pressurizing device configured to press the pressurizing plate to pressurize the second end piece pipe, a load cell configured to measure a pressure applied by the pressurizing device, and a controller configured to output the pressure measured by the load cell.

The pressurizing device may be configured to linearly move and pressurize a rod, with the load cell disposed between the rod and the pressurizing plate. The controller may include a stop button configured to stop the rod, a pressure high button configured to move in a direction of pressurization, and a pressure low button configured to move in a direction opposite to the direction of pressurization. The controller may be configured to stop the rod after adjusting the pressure by button manipulation. The controller may include a speed adjusting switch configured to adjust a linear moving speed and a pressure variation speed when manipulated.

The controller may include a setting key configured to enter a target pressure and an automation button configured to automatically adjust pressure. The controller may be configured to control the pressurizing device to allow the pressure measured by the load cell to be the target pressure when the automation button is selected.

The fastening end and the pressurizing plate may be positioned to face each other. The insertion pipe may be sequentially inserted through the first end piece pipe, the valve body, and the second end piece pipe. The pressurizing device may be configured to press down the pressurizing plate.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the disclosure will be described in detail with reference to the accompanying drawings. The same reference denotations may be used to refer to the same or substantially the same elements throughout the specification and the drawings. The embodiments of the disclosure, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Referring to FIG. 1, a fully welded ball valve 100 includes a valve body 110 and two end piece pipes 130a and 130b. The valve body 110 has insertion holes 111 in both sides thereof. A ball 120 with a flow path hole 121 is rotatably received in the valve body 110 between the insertion holes 111. The end piece pipes 130a and 130b respectively are inserted through the insertion holes 111, and welding is performed along the circumferences of the insertion holes 111, allowing the valve body 110 to be coupled with the end piece pipes 130a and 130b. A neck 112 may be welded and installed in the valve body 110 in a direction perpendicular to the axis along which the insertion holes 111 are aligned. A valve stem 113 passes through the neck 112. The ball 120 is fastened to one end of the valve stem 113. The ball 120 may be rotated with the valve stem 113.

Seats 140 for air-tight sealing may be inserted and mounted on the edges of the respective ends, facing the ball 120, of the end piece pipes 130a and 130b. The seats 140 are brought in contact with the ball 120. Springs 141 are provided to allow the seats 140 to elastically contact the ball 120, thereby producing a predetermined contact surface pressure between the ball 120 and each seat 140.

According to an embodiment of the disclosure, a fully welded ball valve assembly jig is provided to assemble the valve body 110 and the two end piece pipes 130a and 130b. The fully welded ball valve assembly jig may be configured to adjust the contact surface pressure between ball 120 and seat 140 while stably maintaining the state of the end piece pipes 130a and 130b being inserted through the insertion holes 111 of the valve body 110.

As the contact surface pressure is left to be adjustable, tag welding may be performed between the insertion holes 111 of the valve body 110 and the outer circumferential surfaces of the end piece pipes 130a and 130b. Thereafter, final welding is performed to produce the fully welded ball valve 100 with a constant contact surface pressure between ball 120 and seat 140.

Hereinafter, preferred embodiments of the disclosure are described with reference to the accompanying drawings to be easily practiced by one of ordinary skill in the art.

Figure 3:
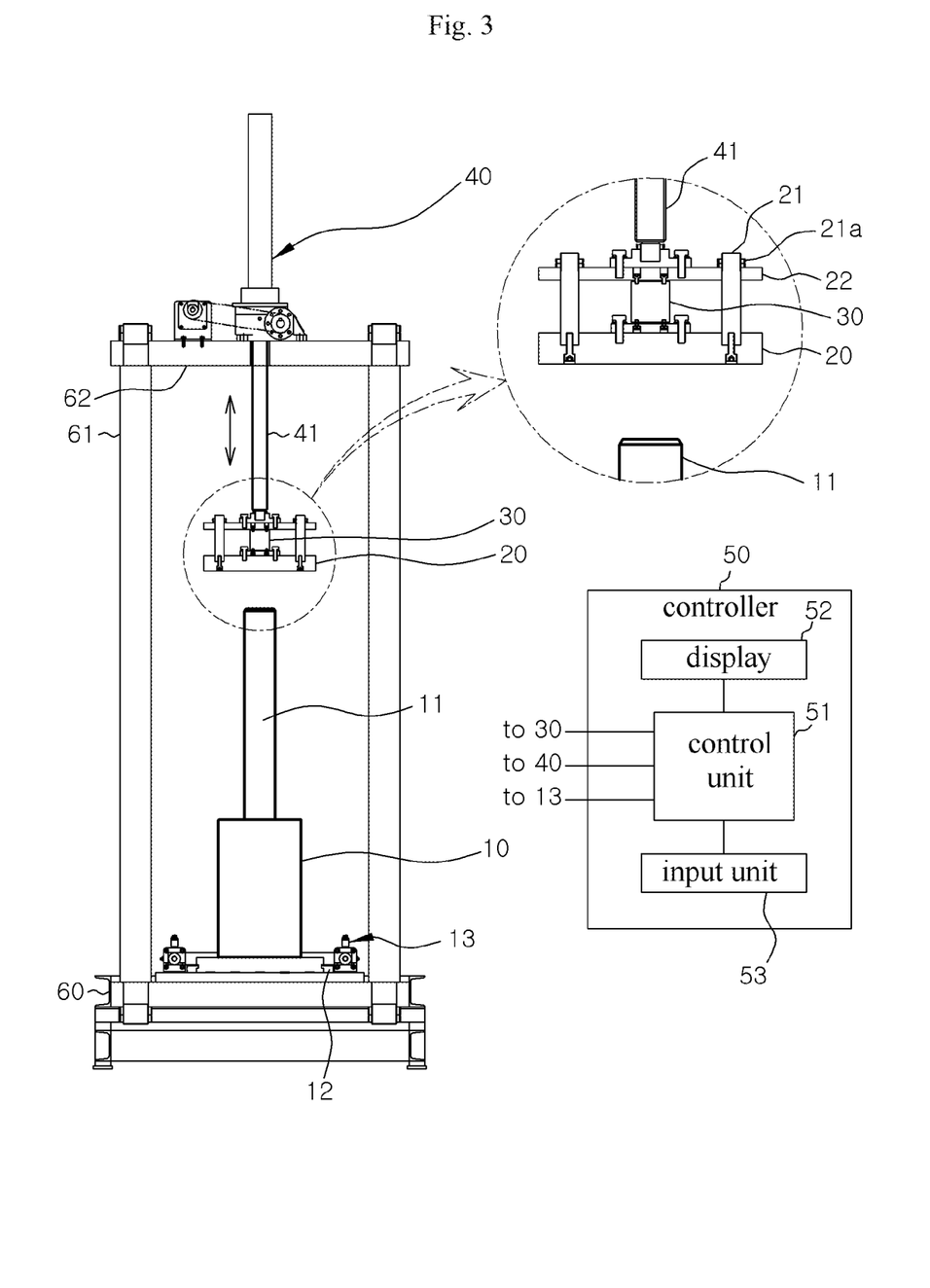
FIG. 3 is a cross-sectional view illustrating a fully welded ball valve assembly jig according to an embodiment of the disclosure.

FIG. 3 is a cross-sectional view illustrating a fully welded ball valve assembly jig according to an embodiment of the disclosure.

Figure 4:
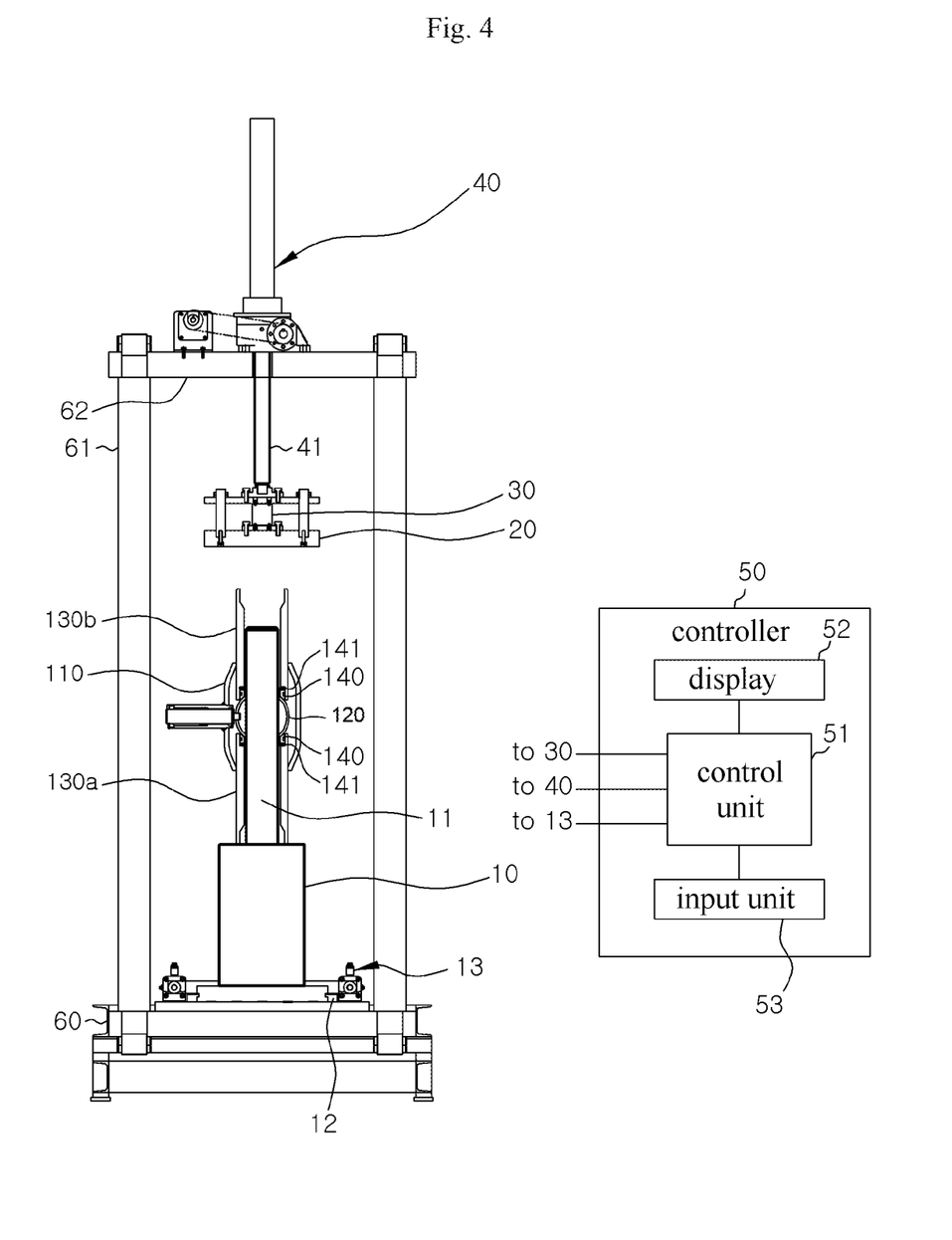
FIG. 4 is a view illustrating an example in which two end piece pipes and a valve body are seated on a fastening end according to an embodiment of the disclosure.

FIG. 4 is a view illustrating an example in which two end piece pipes 130a and 130b and a valve body 110 are seated on a fastening end 10 according to an embodiment of the disclosure.

Figure 5:
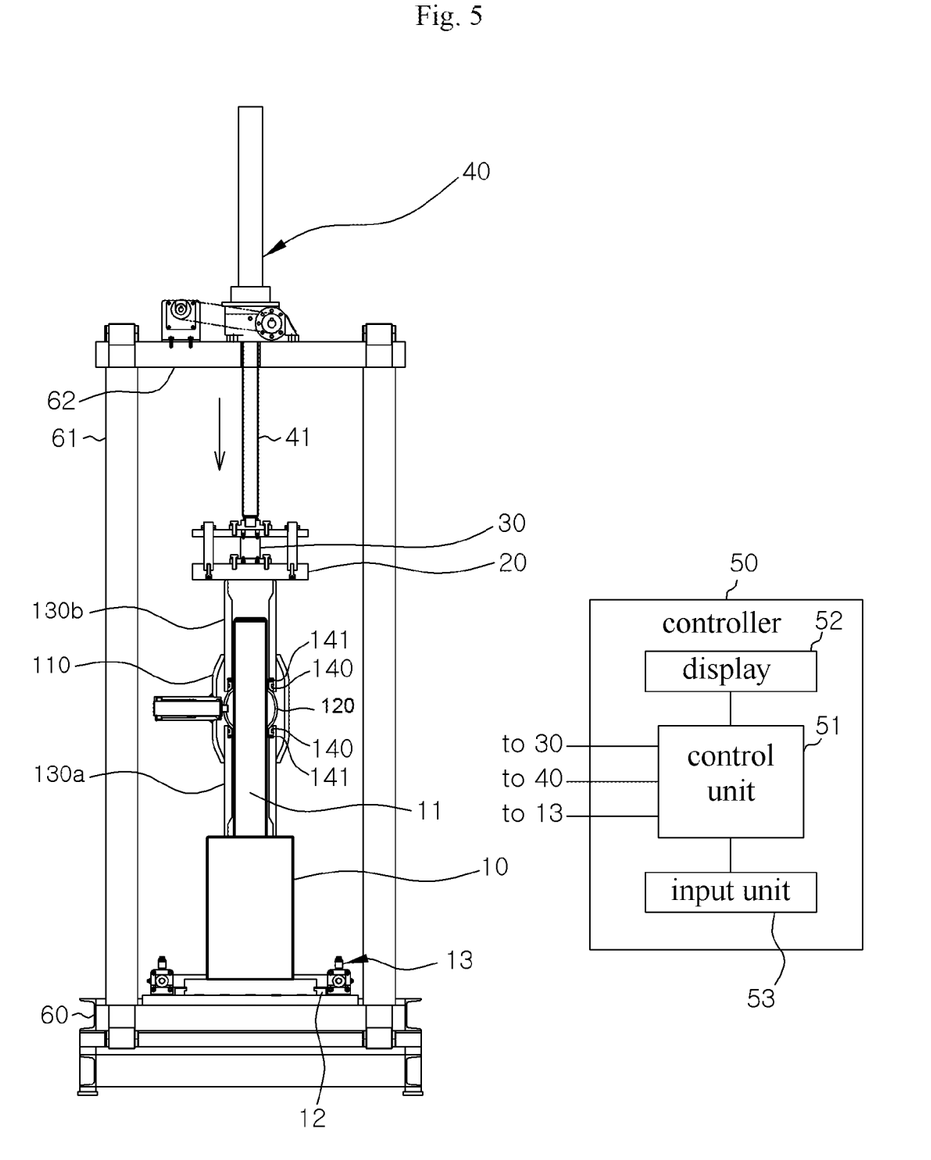
FIG. 5 is a view illustrating an example of pressurizing by a pressurizing plate, with pressure adjusted, in the state shown in FIG. 4, according to an embodiment of the disclosure.

FIG. 5 is a view illustrating an example of pressurizing by a pressurizing plate 20, with pressure adjusted, in the state shown in FIG. 4, according to an embodiment of the disclosure. FIG. 5 illustrates a context in which the contact surface pressure between ball 120 and seat 140 is adjusted.

According to an embodiment of the disclosure, a fully welded ball valve assembly jig includes a fastening end 10, a pressurizing device 40, an assembly of a pressurizing plate 20 and a load cell 30, a controller 50, and a frame 60, 61, and 62. An insertion pipe 11 projects from the top center of the fastening end 10. The pressurizing device 40 is configured to move up or down a rod 41, which is positioned upright, above the insertion pipe 11. The assembly of the pressurizing plate 20 and the load cell 30 is fastened to the bottom of the rod 41. The controller 50 is manipulated by the user to control the overall operation of the fully welded ball valve assembly jig. The frame 60, 61, and 62 stably supports the fastening end 10 and the pressurizing device 40.

The frame 60, 61, and 62 includes a base frame part 60 forming the bottom, a vertical frame part 61 projecting up from the base frame part 60, and a horizontal frame part 62 fastened to the top of the vertical frame part 61.

The fastening end 10 is installed on the top of the base frame part 60. The fastening end 10 may be moved along a rail 12 by a linear actuator 13 to escape from the space under the pressurizing plate 20. The linear actuator 13 may be a motor capable of linearly moving the fastening end 10.

The top surface of the fastening end 10 may have a larger diameter than that of, at least, the end piece pipes 130a and 130b, so that one end piece pipe 130a may be placed on the top surface of the fastening end 10.

The insertion pipe 11 projecting form the top center of the fastening end 10 may be inserted into the valve body 110 and the end piece pipes 130a and 130b.

Referring to FIG. 4, the insertion pipe 11 is shaped as a pipe that may be sequentially inserted through one end piece pipe 130a (hereinafter, referred to as "first end piece pipe 130a"), the valve body 110, and the other end piece pipe 130b without leaving damage and may have an outer diameter capable of minimizing movement or wobble in the inserted state. The insertion pipe 11 may pass through the flow path hole 121 of the ball 120 while passing through the valve body 110.

The insertion pipe 11 may be as long as its top end may be inserted into the inside of the other end piece pipe 130b (hereinafter, referred to as "second end piece pipe 130b") but does not reach the pressurizing plate 20 although the end piece pipe 130b is pressurized by the pressurizing plate 20.

The end piece pipes 130a and 130b are inserted through the insertion holes 111 of the valve body 110 to reach both sides of the ball 120, the assembly of the valve body 110 and the end piece pipes 130a and 130b is erected and is penetrated by the insertion pipe 11. The pressurizing plate 20 presses and moves down the second end piece pipe 130b from thereabove but without reaching the insertion pipe 11.

The fastening end 10 with the insertion pipe 11 has a structure of supporting from thereunder and a structure of maintaining the erect position free from inclination, stably maintaining the state of the two end piece pipes 130a and 130b being inserted and fitted in the valve body 110.

In such a stable state, the second end piece pipe 130b is pushed down by the pressurizing plate 20 to be slightly adjusted in its descending distance, thereby allowing for fine and precise adjustment of the contact surface pressure between ball 120 and seat 140.

The pressurizing device 40 vertically moves up or down the rod 41 which is in an erect position. The pressurizing device 40 may be configured of, e.g., an electromotive cylinder or a screw jack. The pressurizing device 40 is fastened to the horizontal frame part 62. The pressurizing device 40 may be any device capable of linearly moving up and down the rod 41. The pressurizing device 40 may be configured to be able to precisely control the quantity of ascending or descending to precisely adjust the contact surface pressure.

The pressurizing plate 20 is configured of a plate material to press the upper, second end piece pipe 130b down to the lower, first end piece pipe 130a. To that end, the pressurizing plate 20 has a bottom surface which is parallel with and faces the top surface of the fastening end 10.

The load cell 30 is disposed between the rod 41 and the pressurizing plate 20 to measure the pressure applied by the pressurizing plate 20 when the second end piece pipe 130b is pressurized by the pressurizing plate 20.

According to an embodiment of the disclosure, guide pipes 21 and a load cell fastening plate 22 are installed on the pressurizing plate 20. The load cell fastening plate 22 is disposed parallel to the pressurizing plate 20. The guide pipes 21 flexibly allows a gap between the load cell fastening plate 22 and the pressurizing device 40. The load cell 30 is disposed between the pressurizing plate 20 and the load cell fastening plate 22. Each of the guide pipes 21 has a lower end fastened to the pressurizing plate 20 and an upper end passing through the load cell fastening plate 22 and secured with a nut 21a, thereby preventing the pressurizing plate 20 from escaping off downwards while permitting the pressurizing plate 20 to move upwards.

The top surface of the load cell fastening plate 22 is fastened to the bottom of the rod 41 which may be moved up and down by the pressurizing device 40.

As shown in FIG. 5, the pressurizing device 40 may move the rod 41 down to press the pressurizing plate 20 down, thereby pressurizing the top of the second end piece pipe 130b with the pressurizing plate 20. The pressure applied to the second end piece pipe 130b when the second end piece pipe 130b is pressurized may be measured by the load cell 30.

Figure 6:
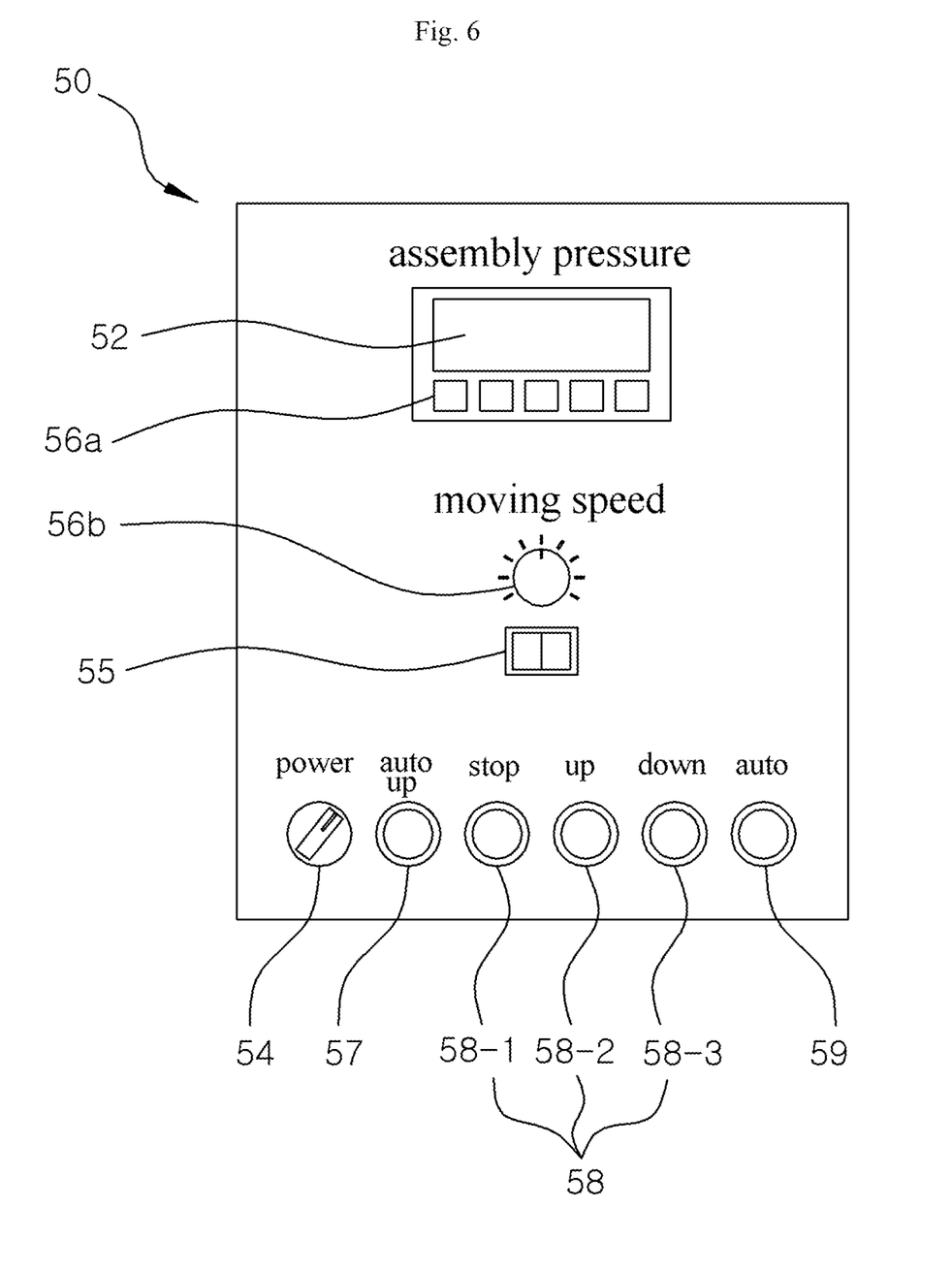
FIG. 6 is a front view illustrating a controller according to an embodiment of the disclosure.

The controller 50 includes an input unit 53 and 54 to 59 for user manipulation, a display 52 for outputting information, and a control unit 51 for controlling the linear actuator 13 and the pressurizing device 40 according to the user's manipulation and outputting the pressure measured by the load cell 30 to the display 52.

The control operation by the control unit 51 may be performed by manipulating the input unit 53 and 54 to 59. The configuration of the input unit 53 and 54 to 59 is described below with reference to FIG. 6.

FIG. 6 is a front view illustrating a controller 50 according to an embodiment of the disclosure.

Referring to FIG. 6, the input unit 53 and 54 to 59 may be provided on the front surface of the controller 50 and may include a power switch 54, an alignment button 55, a setting key 56a, a speed adjusting switch 56b, a return button 57, manual buttons 58, and an automation button 59.

The power switch 54 is a switch to power and activate the fully welded ball valve assembly jig.

The alignment button 55 may be a combination of a forward button and a reverse button. When the reverse button is pressed, the control unit 51 activates the linear actuator 13 to move the fastening end 10 off the position under the pressurizing plate 20, thereby allowing the valve body 110 and the end piece pipes 130a and 130b to be seated on the fastening end 10. When the forward button is pressed, the control unit 51 may activate the linear actuator 13 to move and position the fastening end 10 under the pressurizing plate 20 so that the fastening end 10 is aligned with the pressurizing plate 20.

The setting key 56a is a key for the user to enter settings while viewing the screen of the display 52. The setting key 56a may be used to enter a target pressure which is to be automatically adjusted to. The control unit 51 stores or memorizes an entered pressure as the target pressure and applies it when the automation button 59 is pressed.

The speed adjusting switch 56b is a switch for setting the ascending and descending speeds of the rod 41 which is moved up or down by the pressurizing device 40. The control unit 51 stores or memorizes a moving speed entered via the speed adjusting switch 56b and applies it when the pressurizing device 40 is driven according to the manipulation of the manual buttons 58 or the automation button 59. The speed adjusting switch 56b may be useful when the pressure needs to be adjusted manually and precisely.

The return button 57 is a button to place the pressurizing plate 20 on the upper, second end piece pipe 130b. When the return button 57 is pressed, the control unit 51 activates the pressurizing device 40 to elevate the pressurizing plate 20.

The manual buttons 58 include a pressure high button 58-3 to move the pressurizing plate 20 in the direction of pressurization (e.g., to move the pressurizing plate 20 up), a pressure low button 58-2 to move the pressurizing plate 20 in the direction opposite to the direction of pressurization (e.g., to move the pressurizing plate 20 down), and a stop button 58-1 to stop the pressurizing plate 20.

As the pressure high button 58-3 or the pressure low button 58-2 are pressed, the control unit 58 may control the pressurizing device 40 to move up or down the rod 41, thereby adjusting the pressure applied to the upper, second end piece pipe 130b through the pressurizing plate 20 and outputting the pressure measured by the load cell 30 to the display 52. The user may identify, through the display 52, the pressure that varies depending on the manipulation of the pressure high button 58-3 and the pressure low button 58-2 and, when a target pressure is output on the display 52, stop the rod 41 from moving by pressing the stop button 58-1.

The control unit 58 may move up or down the rod 41 at a moving speed set by the speed adjusting switch 56b, allowing the pressure to meet the user's desired pressure variation speed. While adjusting the pressure with the pressure high button 58-3 and the pressure low button 58-2, the user may press the stop button 58-1 and reset the moving speed with the speed adjusting switch 56b. Then, when the pressure is adjusted by the pressure high button 58-3 and the pressure low button 58-2, the control unit 51 may move up or down at the reset moving speed.

Since the contact surface pressure between ball 120 and seat 140 is adjusted, with the ball 120 and the seat 140 contacting each other, the compression length of the spring 141 needs to be finely adjusted. The pressure which is identified and adjusted with the pressurizing device 40 is pressure corresponding to the contact surface pressure and needs to be finely adjusted. To that end, the speed adjusting switch 56b may be used.

The automation button 59 is a button for automatically adjusting the pressure. Unlike when the manual button 58 is manipulated, when the automation button 59 is pressed, the control unit 51 controls the pressurizing device 40 until a target pressure set by the setting key 56a is obtained by the load cell 30. A proportional-integral-differential (PID) control algorithm may be used when controlling the pressurizing device 40 so that the pressure measured by the load cell 30 is the target pressure. The PID control algorithm may be a feedback control algorithm that may calculate the difference between the pressure measured by the load cell 30 and the target pressure and calculate a control value of the pressurizing device 40 to allow the pressure measured by the load cell 30 to be the target pressure to thereby control the pressurizing device 40. In this case, the pressure measured in real-time may be output on the display 52 for the user's check.

As the controller 50 is so configured, the user may adjust the contact surface pressure between ball 120 and seat 140 to correspond to the target pressure by manipulating the input unit 53. When the contact surface pressure is rendered to correspond to the target pressure, the insertion holes 111 may be tag-welded, thereby firmly fastening the end piece pipes 130a and 130b to the valve body 110. Since the end piece pipes 130a and 130b and the valve body 110 are firmly fastened together, the fully welded ball valve with the target contact surface pressure may be produced by performing final welding (or main welding) regardless of whether the fully welded ball valve is mounted on the fully welded ball valve assembly jig or not.

According to an embodiment of the disclosure, the contact surface pressure between ball 120 and seat 140 is adjusted by adjusting the pressure, with the first end piece pipe 130a, the valve body 110, and the second end piece pipe 130b in the upright position. Thus, when the target pressure is determined according to the correlation between the contact surface pressure and the pressure, the target pressure needs to be previously chosen considering a contact surface pressure applied by the weight of the valve body 110 including the neck 112, valve stem 113, and ball 120 and the weight of the upper, second end piece pipe 130b including the seat, spring 141, and support ring 143.

According to an embodiment of the disclosure, in the fully welded ball valve assembly jig, the fastening end 10 and the pressurizing plate 20 may be positioned parallel to each other or inclined with respect to each other. For example, the fully welded ball valve assembly jig shown in FIGS. 3 to 5 may be configured to be inclined. In this case, since the contact surface pressure applied by the weight of the valve body 110 and the weight of the second end piece pipe 130b is varied, the target pressure needs to be selected considering such variation.

According to the embodiments of the disclosure, before welding, the ball-seat contact surface pressure may be adjusted to a target value by identifying and adjusting the pressure by the pressurizing plate 20 while stably supporting the valve body 110 and the two end piece pipes 130a and 130b fitted into the valve body 110. This enables production of fully welded ball valves free from any deviation or error in contact surface pressure that may arise from the dimensional tolerance and assembly tolerance.

According to the embodiments of the disclosure, the pressure variation speed may be adjusted, thereby enabling precise adjustment of the ball-seat contact surface pressure.

According to the embodiments of the disclosure, the contact surface pressure may be automatically adjusted and, thus, process efficiency may increase.

According to the embodiments of the disclosure, assembly may be performed, with the end piece pipes 130a and 130b and the valve body 110 fitted together in the erect position, and this enables precise adjustment of the contact surface pressure in a more stable state.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A jig for assembling a fully welded ball valve, the fully welded ball valve including a valve body having a first insertion hole and a second insertion hole formed in both sides thereof and a ball rotatably received between the first insertion hole and the second insertion hole, a first end piece pipe and a second end piece pipe, respectively, inserted into the first insertion hole and the second insertion hole and each having an annular seat formed on an outer circumference of an edge of an end thereof and elastically brought in tight contact with the ball by a spring, the jig configured to adjust a contact surface pressure between the ball and the annular seat while stably holding the valve body and the first and second end piece pipes, the jig comprising:

a fastening end having a projecting insertion pipe inserted through the first end piece pipe to an inside of the second end piece pipe and configured to support the first end piece pipe to stably maintain a state of the first and second end piece pipes being inserted through the insertion holes of the valve body;

a pressurizing plate configured to pressurize the second end piece pipe to the first end piece pipe;

a pressurizing device configured to press the pressurizing plate to pressurize the second end piece pipe;

a load cell configured to measure a pressure applied by the pressurizing device; and a controller configured to output the pressure measured by the load cell.

2. The jig of claim 1, wherein the pressurizing device is configured to linearly move and pressurize a rod, with the load cell disposed between the rod and the pressurizing plate, wherein the controller includes a stop button configured to stop the rod, a pressure high button configured to move in a direction of pressurization, and a pressure low button configured to move in a direction opposite to the direction of pressurization, wherein the controller is configured to stop the rod after adjusting the pressure by button manipulation, and wherein the controller includes a speed adjusting switch configured to adjust a linear moving speed and a pressure variation speed when manipulated.

3. The jig of claim 1, wherein the controller includes a setting key configured to enter a target pressure and an automation button configured to automatically adjust pressure, and wherein the controller is configured to control the pressurizing device to allow the pressure measured by the load cell to be the target pressure when the automation button is selected.

4. The jig of claim 1, wherein the fastening end and the pressurizing plate are positioned to face each other, wherein the insertion pipe is sequentially inserted through the first end piece pipe, the valve body, and the second end piece pipe, and wherein the pressurizing device is configured to press down the pressurizing plate.

* * * * *